United States Patent [19]

Morton et al.

[11] Patent Number: 5,737,087
[45] Date of Patent: Apr. 7, 1998

[54] MOTION-BASED HARD COPY IMAGING

[75] Inventors: Roger Roy Morton, Penfield; Stephen Gulick, Jr., Rochester, both of N.Y.

[73] Assignee: Eastman Kodak Company, Rochester, N.Y.

[21] Appl. No.: 570,259

[22] Filed: Dec. 11, 1995

[51] Int. Cl.⁶ .................... H04N 1/21; H04N 5/225; G03B 25/02
[52] U.S. Cl. .................. 358/296; 40/454; 358/909.1
[58] Field of Search ............ 352/81, 87; 40/427, 40/430, 106, 454; 358/88, 91, 92, 335, 909.1, 296; 434/365, 426, 96, 97

[56] References Cited

U.S. PATENT DOCUMENTS

| | | | |
|---|---|---|---|
| 3,268,238 | 8/1966 | Finkel | 283/63 |
| 3,538,632 | 11/1970 | Anderson | 40/106.51 |
| 3,585,747 | 6/1971 | Erickson | 40/124.1 |
| 3,943,335 | 3/1976 | Kinker et al. | 235/61.7 |
| 4,463,380 | 7/1984 | Hooks, Jr. | 358/160 |
| 4,562,463 | 12/1985 | Lipton | 358/88 |
| 4,692,792 | 9/1987 | Street | 358/3 |
| 4,783,707 | 11/1988 | Nemoto et al. | 360/105 |
| 4,805,039 | 2/1989 | Otake et al. | 358/335 |
| 4,870,768 | 10/1989 | Watt et al. | 40/430 |
| 4,956,705 | 9/1990 | Wright | 358/88 |
| 4,959,641 | 9/1990 | Bass et al. | 340/700 |
| 5,111,236 | 5/1992 | Lo | 355/22 |
| 5,113,213 | 5/1992 | Sandor et al. | 355/22 |
| 5,130,794 | 7/1992 | Ritchey | 358/87 |
| 5,142,357 | 8/1992 | Lipton et al. | 358/88 |
| 5,151,821 | 9/1992 | Marks | 359/462 |
| 5,157,484 | 10/1992 | Pritchard et al. | 358/91 |
| 5,166,840 | 11/1992 | Nemoto et al. | 360/75 |
| 5,270,751 | 12/1993 | Christian | 353/7 |
| 5,279,912 | 1/1994 | Telfer et al. | 430/17 |
| 5,325,193 | 6/1994 | Pritchard et al. | 348/50 |
| 5,404,316 | 4/1995 | Klingler et al. | 364/514 |
| 5,451,181 | 9/1995 | Denoux | 446/465 |
| 5,455,689 | 10/1995 | Taylor et al. | 358/450 |
| 5,525,383 | 6/1996 | Witkowski | 428/30 |
| 5,539,487 | 7/1996 | Taguchi et al. | 354/115 |

FOREIGN PATENT DOCUMENTS 065 682  6/1982  European Pat. Off. .

OTHER PUBLICATIONS

Magic Motion Business Cards, published by Plasti–Card Corp., The Plastic People, Inc., 1820 N.E. 150 St. No., Miami, Florida 33181.

*Primary Examiner*—Peter S. Wong
*Assistant Examiner*—Gregory J. Toatley, Jr.
*Attorney, Agent, or Firm*—Gordon M. Stewart

[57] ABSTRACT

The invention is directed to a method and apparatus for forming a hard copy motion image from a video motion sequence recorded on a video recording device. The video motion sequence is played and an operator selects a series of motion containing views which are stored in memory. An integral image is printed on a printing medium such that the selected motion containing views can be viewed in sequence by altering the angle between a viewer's eyes and a lenticular or barrier screen located on the printing medium.

15 Claims, 3 Drawing Sheets

MOTION-BASED HARD COPY IMAGING

FIELD OF THE INVENTION

This invention relates to capturing a series of views comprising a brief video sequence from a video recording and providing a hard copy lenticular- or barrier-based image from the video such that a motion sequence in the image can be viewed on the hard copy without the aid of any special devices.

BACKGROUND OF THE INVENTION

Often, a consumer will capture an important video sequence of their family or other personal event on a videotape. Such sequence will typically have at least one part of a view in motion. While a view in this sequence may not produce a good still image, a motion sequence of a second or so in hard copy could provide easy access of the scene to friends and family of the consumer. Examples include athletic views of children, pets performing notable acts or other views where family members may be in motion.

To replay the event for family or friends, the consumer would have to load the videotape and locate the same sequence each time it was desired to be viewed. Additionally, of course, it can only be viewed with a videotape player and attached television. Further, making multiple copies of the sequence will require two videotape recorders and the resulting copies will still be on videotape, each with the foregoing disadvantages.

It would be desirable then, to have a method and apparatus for performing the method, which permits a consumer to readily capture a short sequence from a videotape to produce one or a multiple of hard copies, each of which permits convenient viewing of the sequence without any hardware or specialized viewing devices.

SUMMARY OF THE INVENTION

The present invention then, provides a method of forming a hard copy motion image from a video motion sequence recorded on a video recording means, comprising the steps of:

a) playing the recorded video and, while viewing the views, selecting a series of motion containing views;

b) storing the selected motion containing views; and c) printing the integral image such that the selected motion containing views can be viewed in sequence by altering the angle between a viewer's eyes and a lenticular or barrier screen.

Lenticular screens are well known, as are barrier screens which are essentially a screen with a series of closely spaced slits. One of them would be aligned with the integral image for viewing the image.

It will be understood in the present application, that the integral image can additionally include views from the video recording means, or elsewhere, that do not necessarily contain motion. Also, while the present invention could be used to select a series of views from the video recording means, none of which contains motion (i.e. a number of independent views are captured from the recording means), it is preferred that a series of motion containing views are selected (although again, additional non-motion containing views may be present in the final integral image).

An integral image may, for example, be created in a suitably programmed digital computer processor, before commencing printing. In this case the integral image can be printed directly onto a receiving medium which is aligned with, or can later be aligned with, a lenticular or barrier screen. One alternative, is to print each view, for example using a CRT screen exposed through the lenticules of a lenticular screen, onto a photosensitive surface. In this latter way, the integral image is formed during printing.

The video recording means may be any suitable means on which the video is recorded, such as a videotape or a writeable optical disk. The recording means preferably contains only two-dimensional views from a single source. If a videotape is used, such a videotape may be of a videocassette format commonly used by consumers (e.g. VHS consumer videotape). As for a "video" views or the like, this references an electronic (analog or digital) signal representation of an image (such as a real-world image or computer generated image).

The method has particular application to where the view recorded is one which has horizontal and vertical display directions (these being the normal directions in which the captured image would be viewed), wherein an integral image is formed by interleaving horizontal lines from respective fields (a typical video frame containing two interlaced fields) or generating sequential "tweened" views from motion analysis of respective fields (a "view" including a frame, tweened view, or resampled view). The latter procedure is described, for example, in U.S. Pat. No. 4,862,266 by Gillard. The resulting image may be assembled so that the horizontal lines of the printed integral image will preferably be aligned with horizontal lenticules on a front side of the screen or horizontal openings in the barrier. This alignment can be accomplished during printing (for example, by printing the integral image onto a back side of a lenticular sheet, either from the back side or through lenticules on a front side), or after printing (such as by printing on a separate substrate which is later aligned with lenticules or a barrier sheet). In this manner, the selected motion containing views can be viewed in sequence in their normal orientation, by altering the vertical angle between a viewer's eyes and the printed integral image aligned with a screen (typically by tilting the integral image with attached screen, or also by moving the head upward or downward). It will be appreciated that "vertical angle" is a relative term, and refers to an angle measured between a plane along which a viewer's eyes look and a plane facing a viewer's eyes).

As an additional preferred step in the method, the stored selected motion containing views are displayed (typically on a monitor) in sequence prior to printing the integral image. This can be done in a manner which simulates the appearance of actual viewing of the printed integral image aligned with a lenticular or barrier screen, as the angle between a viewer's eyes and the screen is changed to view the selected motion containing views in sequence.

The selected views will typically be stored as digital images with the aid of suitable known digitizing circuits. With the use of a suitably programmed processor such as a microprocessor of a type commonly used in personal computers, for example, various manipulations of the selected and stored views can be performed. For example, at least one of the selected motion containing views can be replayed on the player and the replayed motion containing view also stored as a digital image. This is followed by averaging at least a portion of the view (and preferably all) of that replayed view with the same view previously stored, to create a new digital view which replaces that previously stored. For higher image quality, motion based averaging would be prefered. This can assist in reducing random noise resulting from each replay of a view (for example, such random noise introduced by the player mechanism and circuitry). Motion based averaging is described, for example, by M. K. Ozkan et al. in "Adaptive Motion-compensated Filtering of Noisy Image Sequences", IEEE Transactions on Circuits and Systems for Video Technology, August 1993.

An apparatus for carrying out the methods of the present invention is also provided. Such an apparatus includes: a player (typically a videotape player) and a monitor; means for selecting the series of motion containing views from other views on the video recording while viewing the views; a storage device for storing the selected motion containing views as selected views (typically digital images); a programmed processor which can create the integral image from the selected views.

The apparatus may also have printed instructions located adjacent the remainder of the apparatus (for example, a hard copy display which is visible to a user from the region of the remainder of the apparatus) or which appear on the monitor (for example, either at the same time or sequentially following execution of each step of the instructions). These instructions direct a user to do the following: play a video recording in the player and activate the means for selecting each of a plurality of views in the tape desired to be made part of the integral image; when selection of desired views is complete, activate the means for displaying on the monitor; when replay of the stored selected motion containing views is complete, select on the means for a user to indicate whether the user wishes to form an integral image from the selected views, whether the user does or does not wish to form the integral image.

The programmed processor may also be programmed to generate a display of the integral image on a monitor in a manner which simulates the viewing of the printed integral image as viewed when aligned with a lenticular or barrier screen, as the angle between a viewer's eyes and the screen is changed to view the selected motion containing views in sequence. In doing this, not only are the individual views displayed in sequence, but they may be displayed with the same resolution as would be seen on the printed integral image when aligned with a lenticular or barrier screen.

The apparatus may also have a specially modified high-quality color film printer (such as described in U.S. Pat. No. 5,276,478) connected to the computer to print the integral image. This connection can, for example, be direct to a serial port of the computer, through a network, or by a high speed modem. The programmed processor may also be programmed to automatically cause the player to replay at least one or more of the selected motion containing views, and then store the replayed motion containing view and average (preferably motion-based) at least a portion (or preferably all) of that replayed view with the same view previously stored, to create a new stored view which replaces that previously stored.

The present invention then, provides a means of having one or more copies of a motion print which can be distributed to family members or others, and saves them the inconvenience of having to watch an entire video tape. These images can be viewed as conveniently as normal prints without the need of any hardware or specialized viewing devices. It is, therefore, not necessary to take time for viewers to sit down together in front of a television or to find the specific area of interest on the video tape before viewing the scene.

DRAWINGS

EMBODIMENTS OF THE INVENTION

Figure 1:
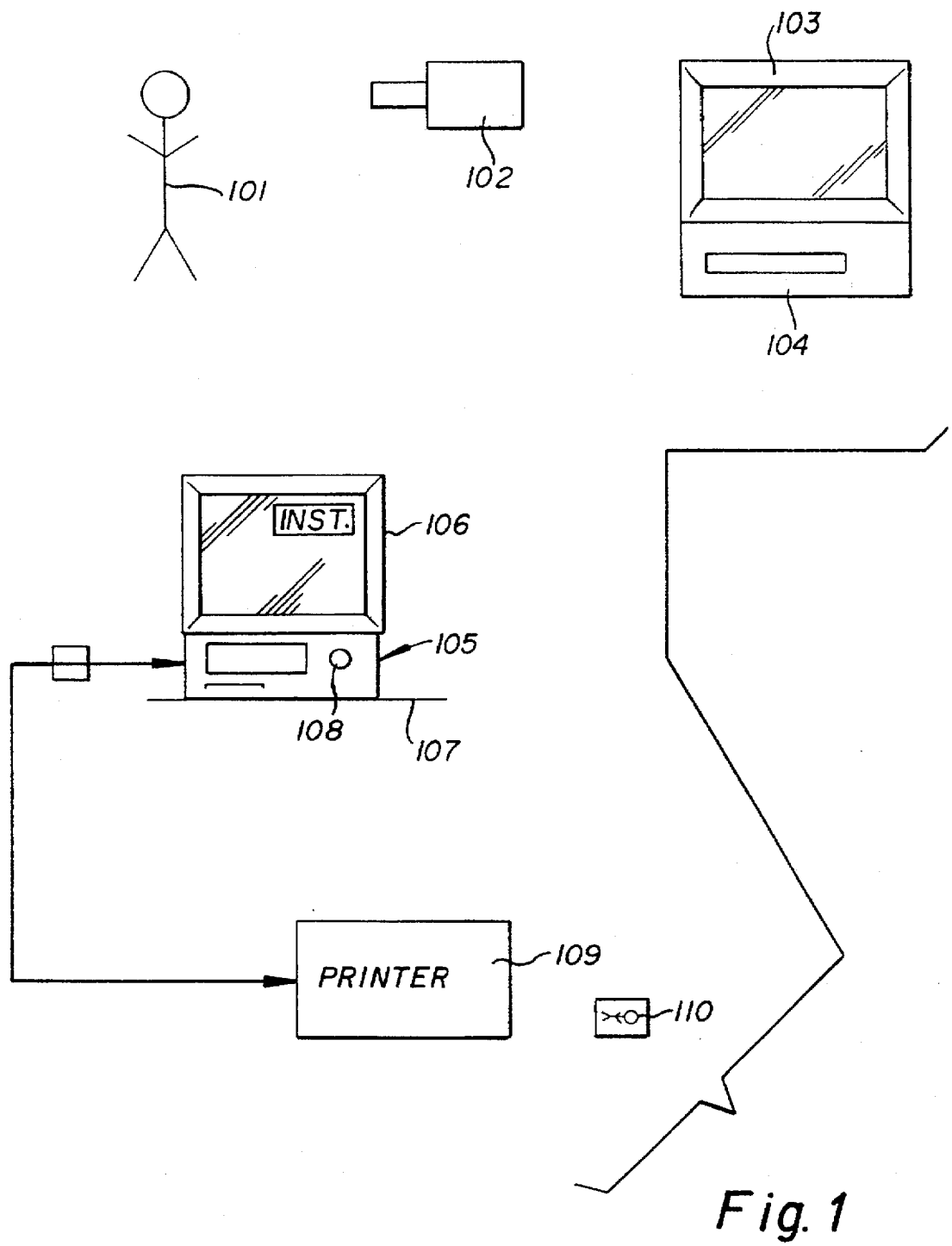
FIG. 1 is a block diagram of an apparatus of the present invention and which also illustrates the method of the present invention.

Referring to FIG. 1, there is shown the basic block diagram functions associated with an embodiment of this invention. First, a consumer captures a sequence of interest 101 with a personal video camera 102 (which includes a videotape recorder which stores views viewed by the camera). This sequence will consist only of two dimensional views taken through one input source (i.e. camera 102, which records only a single frame at a time, each frame of two interlaced fields). Note that each view of the scene will have horizontal and vertical display directions, which are the directions in which the scene is normally viewed (e.g. in FIG. 1 the stick person is normally oriented in the vertical display direction). In the present invention, the consumer will generally be interested in forming a hard copy display of a sequence in which at least one part of the scene is in motion. The consumer then views the captured video sequence on a monitor such as TV set 103 operating in conjunction with a video tape recorder 104.

Once the consumer has selected the segment on the videotape that he wishes to have in a hard copy image, he takes the videotape to a store where, on the countertop, is a videotape recorder 105 with a monitor in the form of TV display 106 positioned on counter 107. Display 106 can provide the necessary instructions for the following steps, each instruction being displayed upon completion of the preceding step.

The consumer inserts the videotape into the video tape recorder 105 and steps through the views (each being a frame) in slow mode or until he has the specific sequence he wishes to use in the hard copy image. He then presses record button 108 and the video tape recorder 105 captures in digital form the desired views as he steps through them. Once captured, this information is stored in a storage internally in the video tape recorder 105 along with the name of the consumer. The data on the selected view is then transmitted via a network or via a removable disk to a lenticular or barrier printer 109. Prior to printing, an integral image is formed for actual printing and alignment with a lenticules on a lenticular sheet or openings in a barrier sheet. Printer 109 prints the sequence on a lenticular or barrier image and the resulting image 110 is either mailed to the customer or picked up by him at the store at counter 107.

Figure 5:
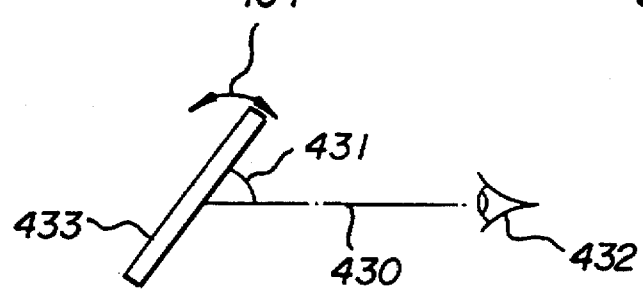
FIG. 5 shows tilting of an integral image and aligned lenticular assembly.

Techniques for forming integral images by interlacing lines from views to create sets of image lines for each lenticule or barrier line opening, are very well known. For example, such are described in allowed U.S. patent application Ser. No. 08/195,231 entitled "ELECTRONICALLY INTERPOLATED INTEGRAL PHOTOGRAPHY SYSTEM" (assigned U.S. Pat. No. 5,455,689 to issue on Oct. 3, 1995). While that application describes formation of three dimensional images, the same method can be used for forming an integral image from the individual views in the present case. However, in the present case the interpolation described in that application is not necessary. Further, in the present case preferably each set of image lines are horizontal lines from the images and the lenticules or barrier sheet openings are likewise horizontal. This is preferred since more sets of views can be recorded than if vertical line sets were used, since with horizontal line sets both eyes of a user see the same line at any given vertical angle. The series can be displayed by changing the vertical angle between the user's eyes and the final assembled hard-copy. This is illustrated in FIG. 5 where a viewer's eye 432 (the other eye being in a plane extending perpendicular to the paper along a line-of-sight 430) can see the series by tilting an integral image and aligned lenticular assembly 433, in the directions of arrow 434 through vertical angle 431.

Figure 2:
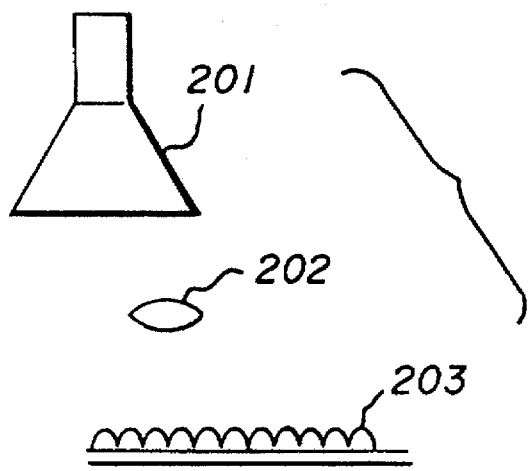
FIGS. 2 and 3 illustrates a method for printing lenticular images.

Referring to FIG. 2, there is shown a method for printing lenticular images. Methods of printing lenticular or barrier images are very well known. For motion images in particular, such are described in U.S. Pat. Nos. 3,268,238 and 3,538,632. A preferred method is described in U.S. patent application Ser. No. 08/430,076 entitled "DEVICE AND METHOD FOR PRODUCING LENTICULAR IMAGES WITH MOTION" filed by Stephen Gulick on Apr. 27, 1995. That application and all other references cited in the present application, are incorporated herein by reference. The preferred horizontal line sets of the integral image are arranged behind horizontally oriented lenticules (or barrier openings, if a barrier screen is used instead).

Figure 3:
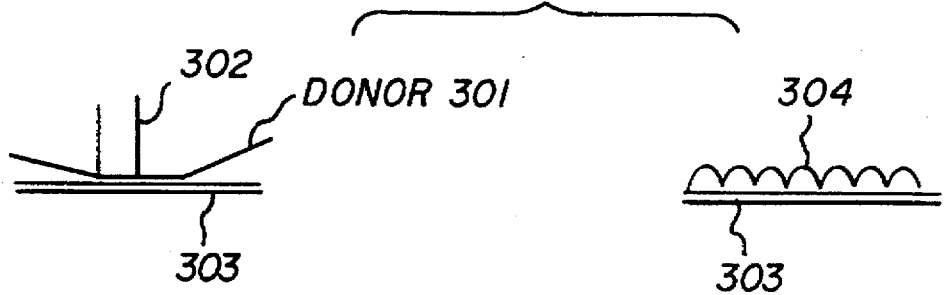

Referring again to FIG. 2, a CRT 201 images through lens 202 to integral lenticular material 203 on which is coated on the smooth side a photographically sensitive material. This technique is described in more detail in U.S. patent applications Ser. No. 07/974,441 entitled "CRT PRINTER FOR LENTICULAR PHOTOGRAPHS" filed Nov. 12, 1992 by Roy Taylor. Another printing technique is shown in FIG. 3 where a thermal head 302 is used to print through a donor material 301 to receiver 303. The receiver is then laminated in alignment with lenticular material 304. Less preferably, the printing may be done on a separate layer which is later attached to the lenticular or barrier sheet.

Figure 4:
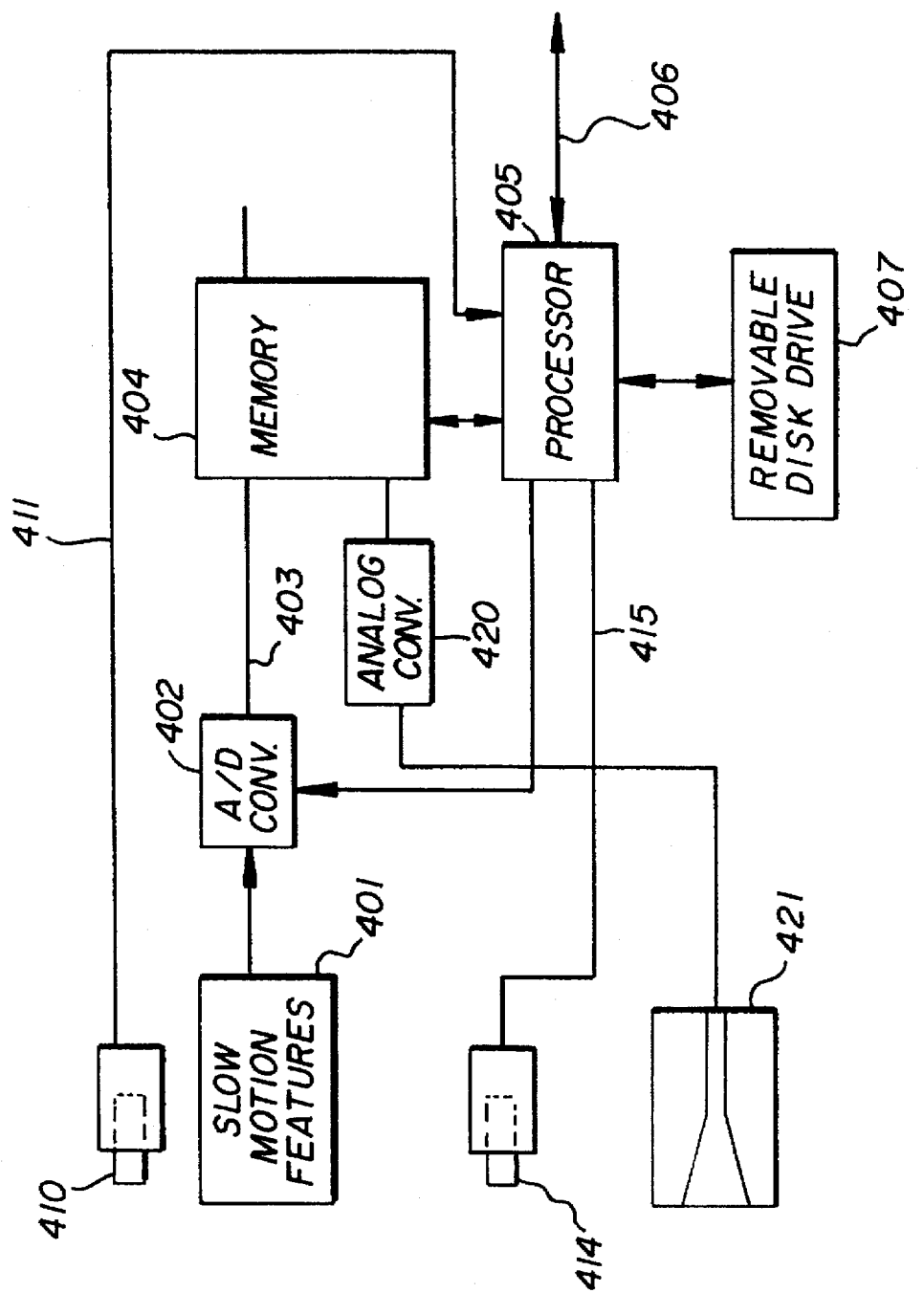
FIG. 4 is a block diagram of a special video tape recorder 105 shown in FIG. 1, which includes a suitably programmed microprocessor.

FIG. 4 shows a block diagram of the special videotape player 105, which includes suitably programmed processor 405 (for example, this may be a microprocessor of a type commonly used in personal computers). This videotape player comprises a conventional video tape player with pause and slow motion features 401. In addition, the output of the video tape recorder is sent to A/D converter 402 which digitizes the video onto lines 403 and places the digitized video in digital memory 404 under control of processor 405.

Processor 405 is also connected to network 406 and is also able to write the stored information on removable disk drive 407. The storage of information into memory 404 is triggered by a push-button 410 so that whenever a stationary view appears that the viewer wishes to record as part of his image button 410 is pressed and this signal is sent to processor 405 along line 411 so that view is stored in memory 404. Push-button 410 then, acts as a means for selecting the series of motion containing views from other views on the videotape while viewing the views.

In order to insure high image quality the processor is also able to collect multiple copies of the same view from video tape recorder 105 and average these copies together (preferably motion based averaging) to improve the image quality of that view. This can be arranged to be done manually by a user reselecting one or more such views for replaying, or processor 405 can be suitably programmed to control the tape playing so as to replay one or more of the selected views, one or more times either automatically or by a user providing an input through a suitable keypad (not shown) to replay and average each view a given number of times. An additional feature of the present system is that once all the desired views are captured, which will generally be between 12–30 views, button 414 may be pressed which generates a signal on line 415 to cause the processor 405 to read from memory 404 at video rates into the digital to analog converter 420. The total view sequence and then this sequence is sent back to video display 421 so that the consumer may preview the view sequence that has been captured. Button 414 then, together with suitably programmed processor 405, acts as a means for displaying on the monitor, the stored selected motion containing views in sequence.

If the consumer is pleased with the sequence, he can again press button 414 to send the digital data to the removable disk drive 407 or down network 406, alternatively he can again begin the capture sequence again by pressing button 410.

Alternatively, an integral image can be formed by processor 405 which is then sent to removable disk drive 407 or network 406. A printer is connected to receive the integral image and print it, in a manner such as already described.

The preceding examples are set forth to illustrate specific embodiments of this invention and are not intended to limit the scope of the invention. It will be understood that variations and modifications can be effected within the spirit and scope of the invention.

PARTS LIST

Sequence Of Interest 101
Camera 102
TV Set 103
Video Tape Recorder 104
Video Tape Recorder 105
Display 106
Counter 107
Record Button 108
Printer 109
Image 110
CRT 201
Lens 202
Lenticular Material 203
Donor Material 301
Thermal Head 302
Receiver 303
Lenticular Material 304
Slow Motion Features 401
A/D Converter 402
Lines 403
Memory 404
Processor 405
Network 406
Removable Disk Drive 407
Button 410
Line 411
Button 414
Line 415
Analog Converter 420
Video Display 421

We claim:
1. A method of forming a hard copy motion image from a video motion sequence recorded on a video recording means which sequence contains views from a source, comprising the steps of:
- a) playing the recorded video, viewing the views, and selecting a series of motion containing views, wherein each of the views corresponds to a distinct image at a specific period of time;
- b) storing the selected motion containing views, and
- c) printing an integral image on a printing medium such that the selected motion containing views can be viewed in sequence by altering an angle between a viewer's eyes and a lenticular or barrier screen located on the printing medium.

2. A method of forming a hard copy motion image from a video motion sequence recorded on a video recording means, which sequence records a scene having vertical and horizontal display directions, comprising the steps of:
- a) playing the recorded video, viewing the views, and selecting a series of motion containing views, wherein each of the views corresponds to a distinct image at a specific period of time;
- b) storing the selected motion containing views, and
- c) printing an integral image on a printing medium such that the selected motion containing views can be viewed in sequence by altering the vertical angle between a viewer's eyes and a lenticular or barrier screen located on the printing medium.

3. A method according to claim 2 wherein, prior to printing, the integral image is formed from the selected views by interleaving horizontal lines from them.

4. A method according to claim 2 additionally comprising aligning the integral image with a lenticular or barrier screen.

5. A method according to claim 1 additionally comprising displaying on a monitor, the stored selected motion containing views in sequence prior to printing the integral image.

6. A method according to claim 2 wherein the integral image is displayed on the monitor in a manner which simulates the viewing of the printed integral image aligned with a lenticular or barrier screen, as the angle between a viewer's eyes and the screen is changed to view the selected motion containing views in sequence.

7. A method of forming a hard copy motion image from a video motion sequence recorded on a video recording means, comprising the steps of:
- a) playing the recorded video, viewing the views, and selecting a series of motion containing views, wherein each of the views corresponds to a distinct image at a specific period of time;
- b) storing the selected motion containing views,
- c) replaying at least one of the selected motion containing views;
- d) averaging at least a portion of the view of that replayed view with the same view previously stored to create a new stored view which replaces that previously stored; and
- e) printing an integral image on a printing medium such that the selected motion containing views can be viewed in sequence by altering an angle between a viewer's eyes and a lenticular or barrier screen located on the printing medium.

8. A method according to claim 7 additionally comprising using at least two different motion containing views for motion based noise reduction in at least one of the views.

9. An apparatus for forming a hard copy motion image from a video motion sequence recorded on a video recording means which contains views from a source, comprising:
- a) means for playing the video recording means and viewing views recorded thereon;
- b) means for selecting a series of motion containing views from other views while viewing the views, wherein each of the views corresponds to a distinct image at a specific period of time;
- c) a storage device for storing the selected motion containing views; and
- d) a programmed processor which can create an integral image from the selected views, which integral image when printed on a printing medium will allow a viewing of the selected motion containing views in sequence by altering an angle between a viewer's eyes and a lenticular or barrier screen located on the printing medium.

10. An apparatus for forming a hard copy motion image from a video motion sequence recorded on a video recording means which contains views from a source, comprising:
- a) a means for playing the video recording means and viewing views recorded thereon;
- b) means for selecting a series of motion containing views from other views while viewing the views, wherein each of the views corresponds to a distinct image at a specific period of time;
- c) a storage device for storing the selected motion containing views;
- d) means for displaying the stored selected motion containing views in sequence;
- e) means for a user to indicate whether the user wishes to form an integral image from the selected views;
- f) a programmed processor which can, in response to the means for a user to indicate, create an integral image from the selected views which integral image when printed on a printing medium will allow viewing of the selected motion containing views in sequence by altering an angle between a viewer's eyes and a lenticular or barrier screen located on the printing medium; and
- g) printed instructions located adjacent the remainder of the apparatus or which appear on the monitor, which instructions direct a user:
- to play the video recording means in the means for playing and activate the means for selecting a series of motion views when viewing views desired to be made part of the hard copy motion image;
- when selection of desired views is complete, to activate the means for displaying; and
- when replay of the stored selected motion containing views is complete, to select on the means for a user to indicate whether the user wishes to form an integral image from the selected views, whether the user does or does not wish to form the integral image.

11. An apparatus for forming a hard copy motion image of a video motion sequence recorded on a video recording means, which sequence records a scene having vertical and horizontal display directions, comprising:
- a) a means for playing the video recording means and viewing views recorded thereon;
- b) means for selecting a series of motion containing views from other views on the video recording means while viewing the views, wherein each of the views corresponds to a distinct image at a specific period of time;
- c) a storage device for storing the selected motion containing views as selected views; and
- d) a programmed processor which can create an integral image on a printing medium from the selected views such that the selected motion containing views can be viewed in sequence by alternating the vertical angle between a viewer's eyes and a lenticular or barrier screen located on the printing medium.

12. An apparatus according to claim 9 additionally comprising means for displaying on a monitor, the stored selected motion containing views in sequence.

13. An apparatus according to claim 9 wherein the programmed computer can display the integral image on a monitor in a manner which simulates the viewing of the printed integral as the angle between a viewer's eyes and a lenticular or barrier screen is changed to view the selected motion containing views in sequence.

14. An apparatus according to claim 9 additionally comprising a printer connected to the computer to print the integral image.

15. An apparatus according to claim 9 wherein the programmed processor automatically causes the player to replay at least one of the selected motion containing views, and then stores the replayed motion containing view and averages at least a portion of that replayed view with the same view previously stored to create a new view which replaces that previously stored.

* * * * *

UNITED STATES PATENT AND TRADEMARK OFFICE
CERTIFICATE OF CORRECTION

PATENT NO. : 5,737,087
DATED : April 7, 1998
INVENTOR(S) : Roger Roy Morton and Stephen Gulick, Jr.

It is certified that error appears in the above-indentified patent and that said Letters Patent is hereby corrected as shown below:

On the title page, insert the following:

--Related U.S. Application Data
[60] Provisional application No. 60/004,556, Sep. 29, 1995.--.

Column 1, line 2, insert the following:

--CROSS REFERENCE TO RELATED APPLICATION
Reference is made to and priority claimed from U.S. Provisional application Ser. No. US 60/004,556, filed Sep. 29, 1995, entitled MOTION-BASED HARD COPY IMAGING.--.

Signed and Sealed this

Fourth Day of August, 1998

Attest:

BRUCE LEHMAN

Attesting Officer

Commissioner of Patents and Trademarks